(12) United States Patent
Hwang

(10) Patent No.: US 6,354,656 B1
(45) Date of Patent: Mar. 12, 2002

(54) REINFORCING STRUCTURE OF SILL SIDE PORTION FOR VEHICLES

(75) Inventor: Yong-Gee Hwang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/442,626

(22) Filed: Nov. 17, 1999

(30) Foreign Application Priority Data

May 13, 1999 (KR) .............................................. 99-8123
May 13, 1999 (KR) .............................................. 99-8124

(51) Int. Cl.$^7$ ................................................. B60J 7/00
(52) U.S. Cl. ...................................... 296/209; 296/188
(58) Field of Search .................................. 296/209, 188

(56) References Cited

U.S. PATENT DOCUMENTS

| | | | | |
|---|---|---|---|---|
| 3,132,891 A | * | 5/1964 | Pyuro et al. | 296/209 |
| 3,622,195 A | * | 11/1971 | Lautenbach | 296/209 |
| 4,582,357 A | * | 4/1986 | Nakamura et al. | 296/209 |
| 5,322,338 A | * | 6/1994 | Hirakami | 296/188 |
| 5,354,115 A | * | 10/1994 | Esaki | 296/209 |
| 5,370,438 A | * | 12/1994 | Mori et al. | 296/209 |
| 5,586,799 A | * | 12/1996 | Kanemitsu et al. | 296/188 |
| 5,613,727 A | * | 3/1997 | Yamazaki | 296/209 |
| 5,641,194 A | * | 6/1997 | Honma et al. | 296/209 |
| 5,671,968 A | * | 9/1997 | Masuda et al. | 296/209 |
| 5,720,510 A | * | 2/1998 | Daniel et al. | 296/188 |
| 5,924,765 A | * | 7/1999 | Lee | 296/209 |
| 6,053,564 A | * | 4/2000 | Kamata et al. | 296/188 |

FOREIGN PATENT DOCUMENTS

| | | | | |
|---|---|---|---|---|
| JP | 0039375 | * | 2/1987 | 296/209 |
| JP | 0018784 | * | 1/1989 | 296/209 |
| JP | 0127175 | * | 5/1990 | 296/209 |
| JP | 404129886 A | * | 4/1992 | 296/209 |
| JP | 405208688 A | * | 8/1993 | 296/209 |

* cited by examiner

Primary Examiner—Joseph D. Pape
Assistant Examiner—Hilary Gutman
(74) Attorney, Agent, or Firm—Christie, Parker & Hale, LLP

(57) ABSTRACT

A reinforcing structure of a sill side portion for vehicles, the sill side portion comprising the lower body of a vehicle so constructed therein as to form a plurality of closed sectional surfaces via a plurality of reinforcing members to increase a structural strength against side collisions of a vehicle, and to minimize the degree of deformation caused when the vehicle is involved in a side impact colision, for better safety of passengers therein, wherein a sill side reinforcing panel is centrally coupled to the sill side portion to form a closed section surface between an outer sill side panel and a filler reinforcing panel, and a first reinforcing bracket is vertically coupled inside the sill side reinforcing panel while a second reinforcing bracket is coupled between the outer sill side panel and the filler reinforcing panel, and in addition, lower ends of the inner sill side panel, filler reinforcing panel and side panel are respectively coupled to an area deviant from the center of the sill side portion, the outer sill side panel is coupled to the filler reinforcing panel to form a closed sectional surface and a first sill side reinforcing panel is coupled to between the inner sill side panel and the filler reinforcing panel to form a closed sectional surface, where the filler reinforcing panel is mounted with a second sill side reinforcing panel whose one end is coupled while the other end thereof faces the first sill side reinforcing panel.

2 Claims, 3 Drawing Sheets

US 6,354,656 B1

REINFORCING STRUCTURE OF SILL SIDE PORTION FOR VEHICLES

CROSS-REFERENCE TO RELATED APPLICATIONS

This application claims priority of Korea Patent Application No. 99-8123, filed May 13, 1999 and Korea Patent Application No. 99-8124, filed on May 13, 1999.

BACKGROUND OF THE INVENTION

1. Field of the Invention

The present invention relates to a reinforcing structure of sill side portion for vehicles, and more particularly to a reinforcing structure constructed to additionally mount a reinforcing member between a sill side panel and a side panel and to change a mounting structure for reinforcing a structural strength to the sill side portion, thereby reducing deformation of a vehicle and promoting safety to passengers when the vehicle is collided at a side thereof.

2. Description of the Prior Art

Generally, a sill side portion 10 of a vehicle refers to both sides of a bottom side of a body which is adjacent to the ground, as illustrated in FIG. 1 shown in a deviant crease, and a sectional surface of a center filler corresponding to a central portion of the sill side portion 10 according to the prior art is respectively welded and coupled at an inner sill side panel 12, filler reinforcing panel 16 and side panel 18 at a bottom side thereof, where a bottom portion an outer sill side panel 14 is welded and coupled to a bottom side portion of the side panel and an upper end portion of the outer sill side panel 14 is welded to the inner sill side panel 12 to form a closed sectional view.

Furthermore, between the outer sill side panel 14 and the filler reinforcing panel 16, there is disposed a sill side reinforcing panel 20, where the sill side reinforcing panel 20 is welded and coupled at a bottom portion thereof to the side panel 18 at a bottom side thereof, while an upper side thereof is bent in an predetermined shape at a space between the outer sill side panel 14 and the filler reinforcing panel 16 and arranged therein.

Meanwhile, a section of a portion deviant in the forward and backward direction from a central part of the sill side portion 10 according to the prior art is respectively welded and coupled to the inner sill side panel 12, outer sill side panel 14 and side panel 18 at bottom ends thereof, as illustrated in FIG. 3, and upper ends of the inner sill side panel 12 and the outer sill side panel 14 are respectively welded and coupled, where between bottom ends of the outer sill side panel 14 and the side panel 18 there is welded and coupled a bottom end of the filler reinforcing panel 16.

In other words, upper and lower ends of the inner sill side panel 12 and the outer sill side panel 14 are respectively welded and coupled therebetween to form a closed section by which structural strength of the sill side portion 10 is guaranteed.

Accordingly, the sill side portion 10 of a vehicle according to the prior art is so constructed to join upper and lower ends thereof to form a closed section at the inner sill side panel 12 and the outer sill side panel 14, and more particularly, a center filler portion corresponding to a central sill side portion 10 is equipped with a sill side reinforcing panel 20 between the outer sill side panel 14 and the filler reinforcing panel 16 to thereby guarantee a structural strength to the sill side portion 10 by way of the closed section and the sill side reinforcing panel 20.

However, there is a recent tendency of gradually increasing a demand value of structural strength to the sill side portion by way of precaution against a side collision accident of a vehicle because there is a disadvantage in a regulated requirement by a new law requesting an increased strength value in that the conventional structure of the sill side portion 10 cannot satisfy the safety of passengers, such that increased structural strength for the sill side portion 10 is further requested.

The request of increased structural strength for the sill side portion 10 of a vehicle thus described is to promote obtainment of safety for the passengers from injuries or death when there is an accident involving a side collision in which the side panel 18, filler reinforcing panel 16, the outer sill side panel and the inner sill side panel 12 are respectively pushed inside the vehicle by the shocking force transmitted from the sill side portion 10 of the vehicle.

SUMMARY OF THE INVENTION

The present invention is disclosed to solve the aforementioned problems and it is an object of the present invention to provide a reinforcing structure of a sill side portion for vehicles constructed and arranged to reinforce a structural strength of sill side portion by way of a reinforcing member to thereby decrease deformation of a vehicle and to promote safety for passengers therein when there is an accident involving the vehicle colliding at its sides.

In accordance with the object of the present invention, there is provided a reinforcing structure of a sill side portion for vehicles, wherein a sill side reinforcing panel is centrally coupled to the sill side portion to form a closed sectional surface between an outer sill side panel and a filler reinforcing panel, and a first reinforcing bracket is vertically coupled inside the sill side reinforcing panel while a second reinforcing bracket is coupled between the outer sill side panel and the filler reinforcing panel.

Furthermore, lower ends of the inner sill side panel, filler reinforcing panel and side panel are respectively coupled to an area deviant from the center of the sill side portion, the outer sill side panel is coupled to the filler reinforcing panel to form a closed sectional surface and a first sill side reinforcing panel is coupled between the inner sill side panel and the filler reinforcing panel to form a closed sectional surface, where the filler reinforcing panel is mounted with a second sill side reinforcing panel whose one end is coupled while the other end thereof faces the first sill side reinforcing panel.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
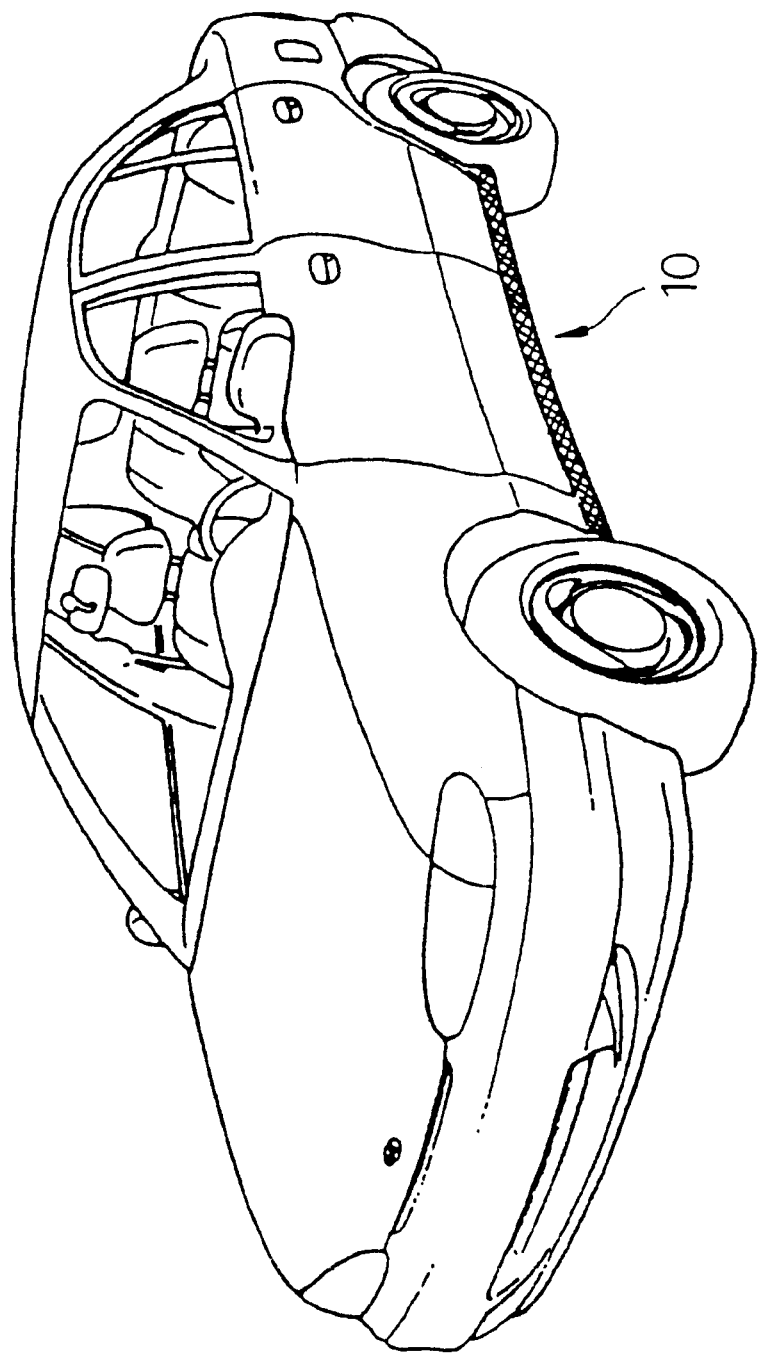
FIG. 1 is a perspective view for illustrating a sill side portion of a vehicle.
Figure 2:
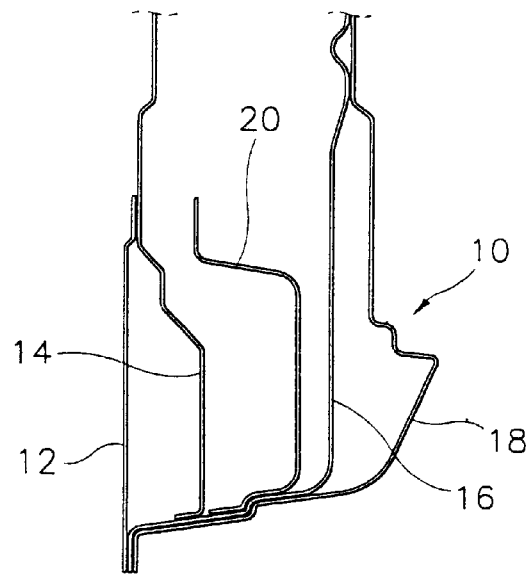
FIG. 2 is a sectional view for illustrating a central part of a sill side portion according to the prior art.
Figure 3:
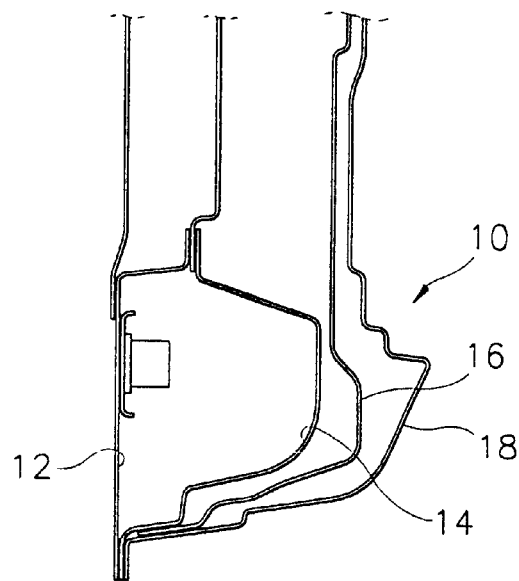
FIG. 3 is a sectional view for illustrating a part departed from a central part of the sill side portion according to the prior art.
Figure 4:
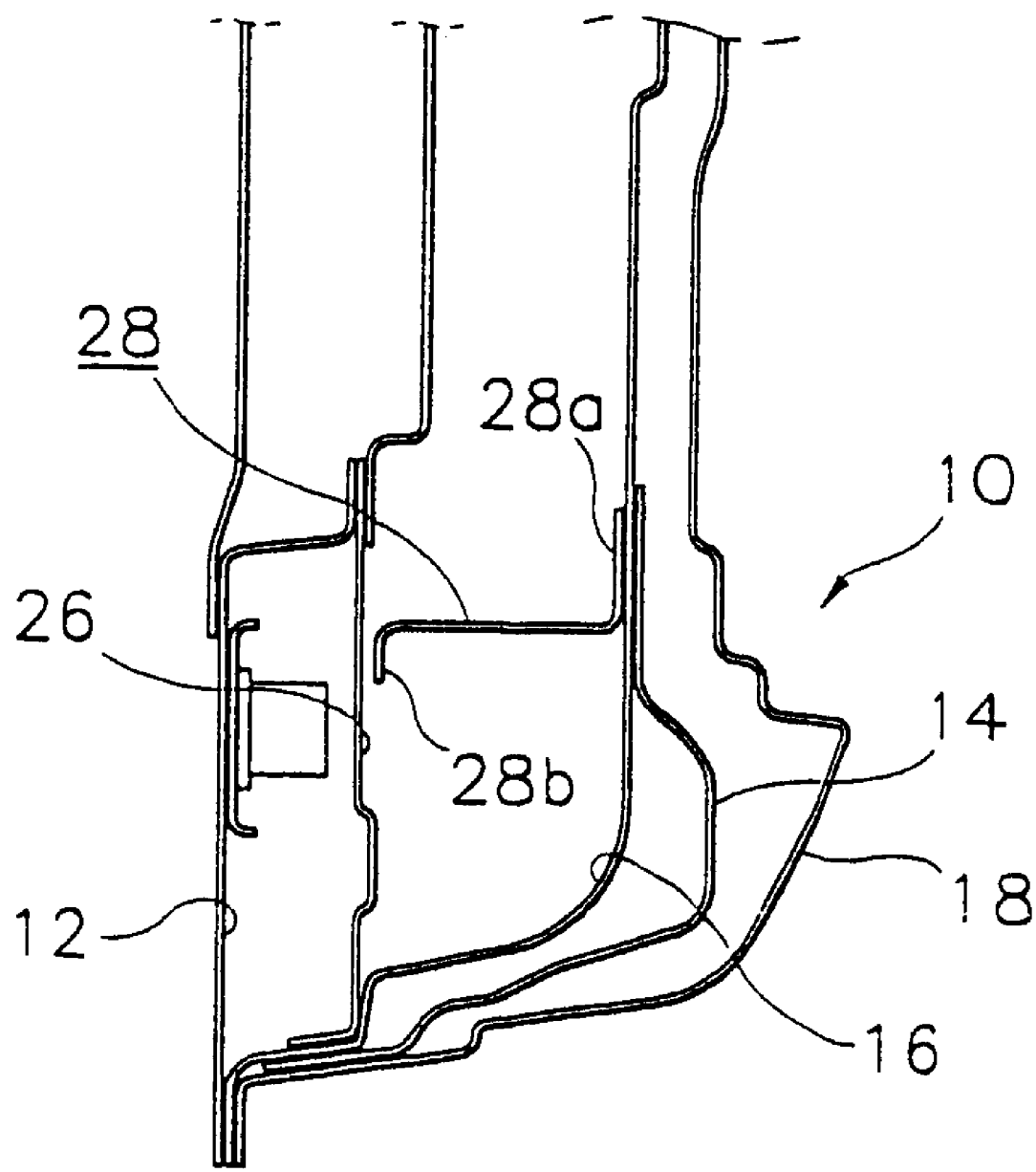
FIG. 4 is a sectional view for illustrating a part deviant from a central part of the sill side portion according to the present invention.

The part distanced from a central part of the sill side portion 10 of a vehicle according to the present invention is welded and coupled by lower ends of the inner sill side panel 12, filler reinforcing panel 16 and the side panel 18 as illustrated in FIG. 4, a lower end of the outer sill side panel 14 is welded and coupled between the filler reinforcing panel 16 and the side panel 18 while an upper end thereof is welded and coupled to form a closed sectional surface at an exterior side of the filler reinforcing panel 16, and a lower end of the filler reinforcing panel 16 is welded and coupled by a lower end of the first sill side reinforcing panel 26 and an upper end thereof is welded and coupled to form a closed sectional surface with the inner sill side panel 12.

Furthermore, an upper joint between the outer sill side panel 14 and the filler reinforcing panel 16 is coupled therein by one end 28a of the second sill side reinforcing panel 28 and the other end 28b of the second sill side reinforcing panel 28 is lengthwise extended toward the first sill side reinforcing panel 26 to end with a small space thereat. At this time, it is preferable that the other end 28b of the second sill side reinforcing panel 28 should be bent upward or downwards in order to enlarge an area of a part facing the first sill side reinforcing panel 26.

When the part of the side sill panel 10 distant of the central part of the side sill panel is constructed as illustrated in FIG. 4, shock from the side collision is initially absorbed by the structural strength possessed by the side panel 18, outer sill slide panel 14 and the filler reinforcing panel 16, and then the shock is again absorbed by the structural strength owned by the first sill side reinforcing panel 26 and the inner sill side panel 12. At this time, the other end 28b of the second sill side reinforcing panel 28 is bent in parallel with the first sill side reinforcing panel 26 to act as a prop between the filler reinforcing panel 16 and the first sill side reinforcing panel 26, thereby enabling the second sill side reinforcing panel 28 to minimize the degree of deformation against the sill slide portion 10.

As a result thereof, the sill side portion 10 can minimize the degree of deformation caused by a side collision to provide safety to the passengers.

In other words, the structural strength against the part distanced from a central part of the sill side portion 10 is reinforced because the first sill side reinforcing panel 26 is welded and coupled between the inner sill side panel 12 and the filler reinforcing panel 16 to form a closed sectional surface, and between the first sill side reinforcing panel 26 and the filler reinforcing panel 16, there is arranged the second sill side reinforcing panel 28 whose one end is fixedly coupled to the filler reinforcing panel 16 and whose other end is disposed a little bit distanced from the first sill side reinforcing panel 26.

As described above, structure of the sill side portion 10 according to the present invention represents an increased number of closed sectional surfaces compared with that of the prior art which is an important yardstick in discerning the degree of structural strength, meaning that the sill side portion 10 according to the present invention can cope with the shock generated in side collision of a vehicle more effectively.

Furthermore, the sectional surface of a part a bit distanced from the central part of the sill side portion 10 of a vehicle is coupled to form a dual closed sectional surface through the inner sill side panel 12, first sill side reinforcing panel 26, filler reinforcing panel 16 and the outer sill slide panel 14, the filler reinforcing panel 16 is coupled therein by one end 28a of the second sill side reinforcing panel 28 while the other end 28b thereof is arranged a little bit distanced from the first sill side reinforcing panel 26, such that the sill side portion 10 can also effectively cope with the shock generated when a vehicle is sideswiped.

As a result thereof, the sill side portion 10 of a vehicle according to the present invention can lately obtain a structural strength which satisfies the new regulations calling for countermeasure to a greater shock.

As apparent from the foregoing, there is an advantage in the reinforcing structure of sill side portion for vehicles according to the present invention in that the sill side portion comprising the lower body of a vehicle is so constructed therein as to form a plurality of closed sectional surfaces via a plurality of reinforcing members to increase a structural strength against side collision of a vehicle, and to minimize the degree of deformation caused by sidewide collision, for better safety of passengers therein.

What is claimed is:

1. A reinforcing structure for a sill side portion, the sill side portion comprising an inner sill side panel, an outer sill side panel, a filler reinforcing panel, a first sill side reinforcing panel, a second sill side reinforcing panel, and a side panel to thereby form a lower side of a vehicle, wherein the first sill side reinforcing panel is coupled to form a closed section with the inner sill side panel, the first sill side reinforcing panel being coupled to the inner sill side panel at an upper end of the inner sill side panel while a lower end of the first sill side reinforcing panel is coupled to the filler reinforcing panel at a lower end of the filler reinforcing panel, and further wherein one end of the second sill side reinforcing panel is coupled to the filler reinforcing panel while the other end of the second sill side reinforcing panel faces the first sill side reinforcing panel, and is spaced apart from the first sill side reinforcing panel, thereby maintaining a gap with the first sill side reinforcing panel.

2. The structure as defined in claim 1, wherein the other end of the second sill side reinforcing panel is bent in parallel with the first sill side reinforcing panel.

* * * * *

UNITED STATES PATENT AND TRADEMARK OFFICE
CERTIFICATE OF CORRECTION

PATENT NO. : 6,354,656 B1
DATED : March 12, 2002
INVENTOR(S) : Young-Gee Hwang

It is certified that error appears in the above-identified patent and that said Letters Patent is hereby corrected as shown below:

<u>Title page,</u>
Item [75], Inventor, the Inventor should read -- Young-Gee Hwang, Ulsan (KR) --

Item [57], ABSTRACT,
Line 7, replace "colision" with -- collision --.
Line 20, after "coupled" delete "to"

Signed and Sealed this

Fifth Day of August, 2003

JAMES E. ROGAN
*Director of the United States Patent and Trademark Office*